United States Patent [19]

Hirabayashi

[11] Patent Number: 5,666,154

[45] Date of Patent: Sep. 9, 1997

[54] IMAGE COMMUNICATION APPARATUS AND METHOD THEREFOR

[75] Inventor: Yasuji Hirabayashi, Kawasaki, Japan

[73] Assignee: Canon Kabushiki Kaisha, Tokyo, Japan

[21] Appl. No.: 549,023

[22] Filed: Oct. 27, 1995

Related U.S. Application Data

[63] Continuation of Ser. No. 102,997, Jul. 28, 1993, abandoned.

[30] Foreign Application Priority Data

Jul. 31, 1992 [JP] Japan ............... 4-2047665

[51] Int. Cl.⁶ ............................... H04N 7/14
[52] U.S. Cl. ............................... 348/17; 348/19
[58] Field of Search ............... 348/17, 19, 384, 348/14, 20, 416, 473; 329/96; H04N 7/14

[56] References Cited

U.S. PATENT DOCUMENTS

| | | | |
|---|---|---|---|
| 3,668,312 | 6/1972 | Yamamoto et al. | 348/19 |
| 4,774,574 | 9/1988 | Daly et al. | 379/96 X |
| 4,935,953 | 6/1990 | Appel et al. | 348/19 |
| 4,962,521 | 10/1990 | Komatsu et al. | 379/96 X |
| 5,136,376 | 8/1992 | Yagasaki et al. | 348/384 |
| 5,177,608 | 1/1993 | Ohki et al. | 348/416 |
| 5,202,764 | 4/1993 | Ida et al. | 348/17 X |
| 5,258,836 | 11/1993 | Murata | 348/416 X |

FOREIGN PATENT DOCUMENTS

| | | |
|---|---|---|
| 0330455 | 8/1989 | European Pat. Off. |
| 3-6189 | 1/1991 | Japan. |
| 4-284791 | 10/1992 | Japan. |
| 2123646 | 2/1984 | United Kingdom. |

OTHER PUBLICATIONS

Patent Abstracts of Japan, vol. 17, No. 91, Feb. 23, 1993.
Patent Abstracts of Japan, vol. 15, No. 114, Mar. 19, 1991.

*Primary Examiner*—Victor R. Kostak
*Attorney, Agent, or Firm*—Fitzpatrick, Cella, Harper & Scinto

[57] ABSTRACT

Image processing apparatus and method whereby image data is weighted and coded for transmission to a receiver. Structure and steps are provided for: (i) the receiver providing to an image pickup device designation information indicative of a desired area of the image data to be transmitted to the receiver; (ii) coding image data to be transmitted from the image pickup device; and (iii) controlling the coding process in accordance with the designation information provided by the receiver.

17 Claims, 5 Drawing Sheets

MASK·LEVEL #1

MASK·LEVEL #2

MASK·LEVEL #3

MASK·LEVEL #4

IMAGE COMMUNICATION APPARATUS AND METHOD THEREFOR

This application is a continuation of application Ser. No. 08/102,997, filed Jul. 28, 1993, now abandoned.

BACKGROUND OF THE INVENTION

1. Field of the Invention

The present invention relates to an image communication apparatus and method therefor, and more particularly to a moving image transmission apparatus adapted for use in a television-telephone apparatus or a television conference system.

2. Related Background Art

In such a moving image communication system, it is preferable to be able to transmit as many images as possible per second, while maintaining satisfactory image quality in each image frame. In the conventional moving image encoding method, since the available amount of codes is by far smaller than the entropy of the image, it has been customary to maintain the image quality in a state of semi-moving image in which the number of image frames per second is limited, or to maintain a sufficient number of image frames per second for the moving image, while sacrificing the image quality. Stated differently, in the conventional method, the image quality and the number of image frames per second are in a trade-off relationship.

Also in the television-telephone or the like, there is proposed a configuration of automatically detecting a part of the object, for example the face of a person, and preferentially allotting codes to the part, thereby enabling transmission of a sufficient number of image frames per second for a moving image, while securing the image quality in a part of the image frame.

However, in such a conventional method of preferentially assigning codes to the face portion of the object, there may eventually result in an error in the automatic detection of the face portion, and such a face portion may not necessarily be the most important part in the image frame. For example, the transmitting person or the receiving person may wish to observe the background or an article held by the person, rather than the person himself, and the above-mentioned conventional method is unable to meet such complex and varying requirements.

SUMMARY OF THE INVENTION

In consideration of the foregoing, an object of the present invention is to provide an image communication apparatus capable of resolving such drawbacks, and a method therefor.

Another object of the present invention is to provide an image transmission method capable of sufficient data compression while maintaining the image quality, and an apparatus adapted therefor.

The above-mentioned objects can be attained, according to an embodiment of the present invention, by a moving image communication apparatus for transmitting an image in the encoded state, comprising input means for entering information indicating the significance of plural each of areas designated by the receiving side, and encoding means for encoding the transmitted image with an image quality corresponding to the significance entered by said input means.

Still another object of the present invention is to provide an image communication method capable of satisfactory moving image transmission, and an apparatus adapted therefor.

Still another object of the present invention is to provide an image communication apparatus which is easy to use.

Still other objects of the present invention, and the features thereof, will become fully apparent from the following description of embodiments, to be taken in conjunction with the attached drawings.

DESCRIPTION OF THE PREFERRED EMBODIMENTS

Now the present invention will be clarified in detail by preferred embodiments thereof shown in the attached drawings.

Figure 1:
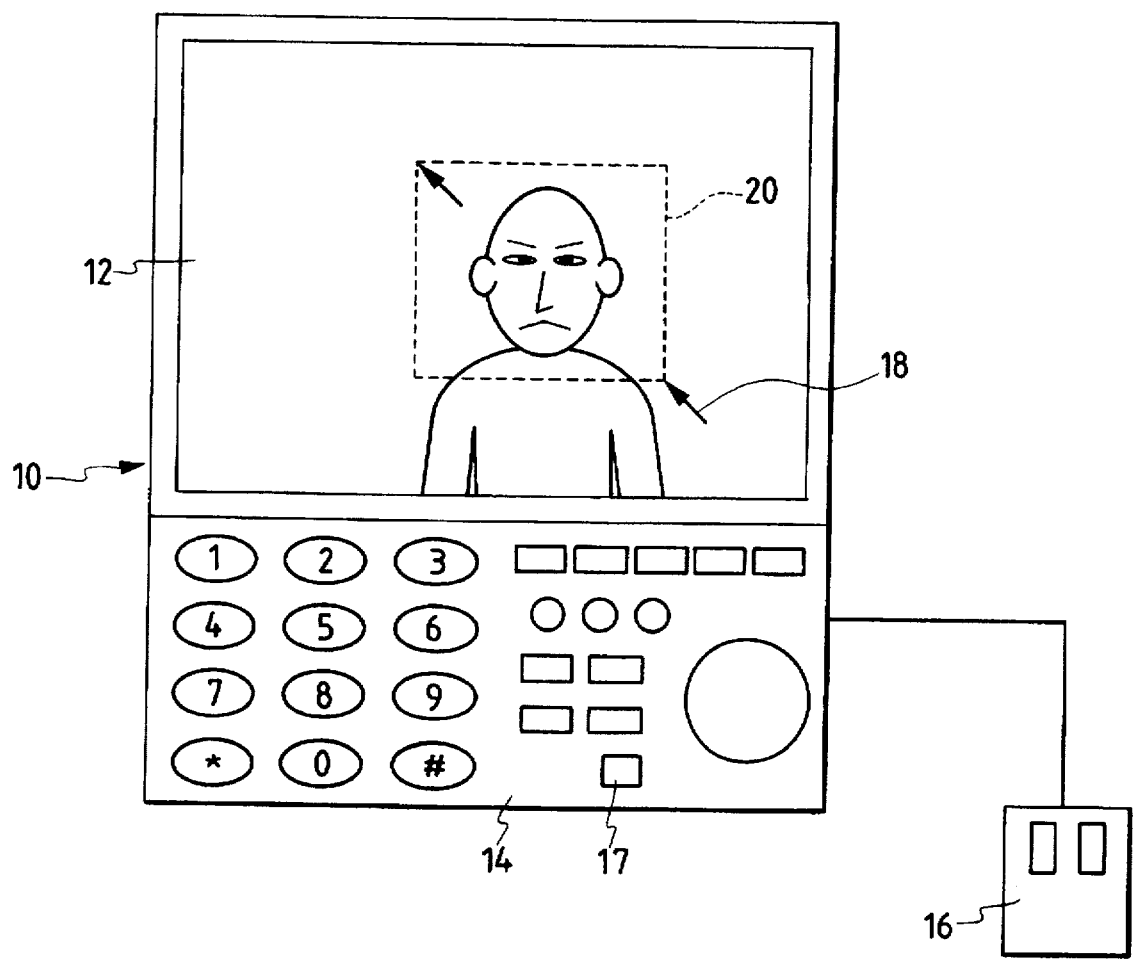
FIG. 1 is an external view of an embodiment of the present invention.
Figure 2:
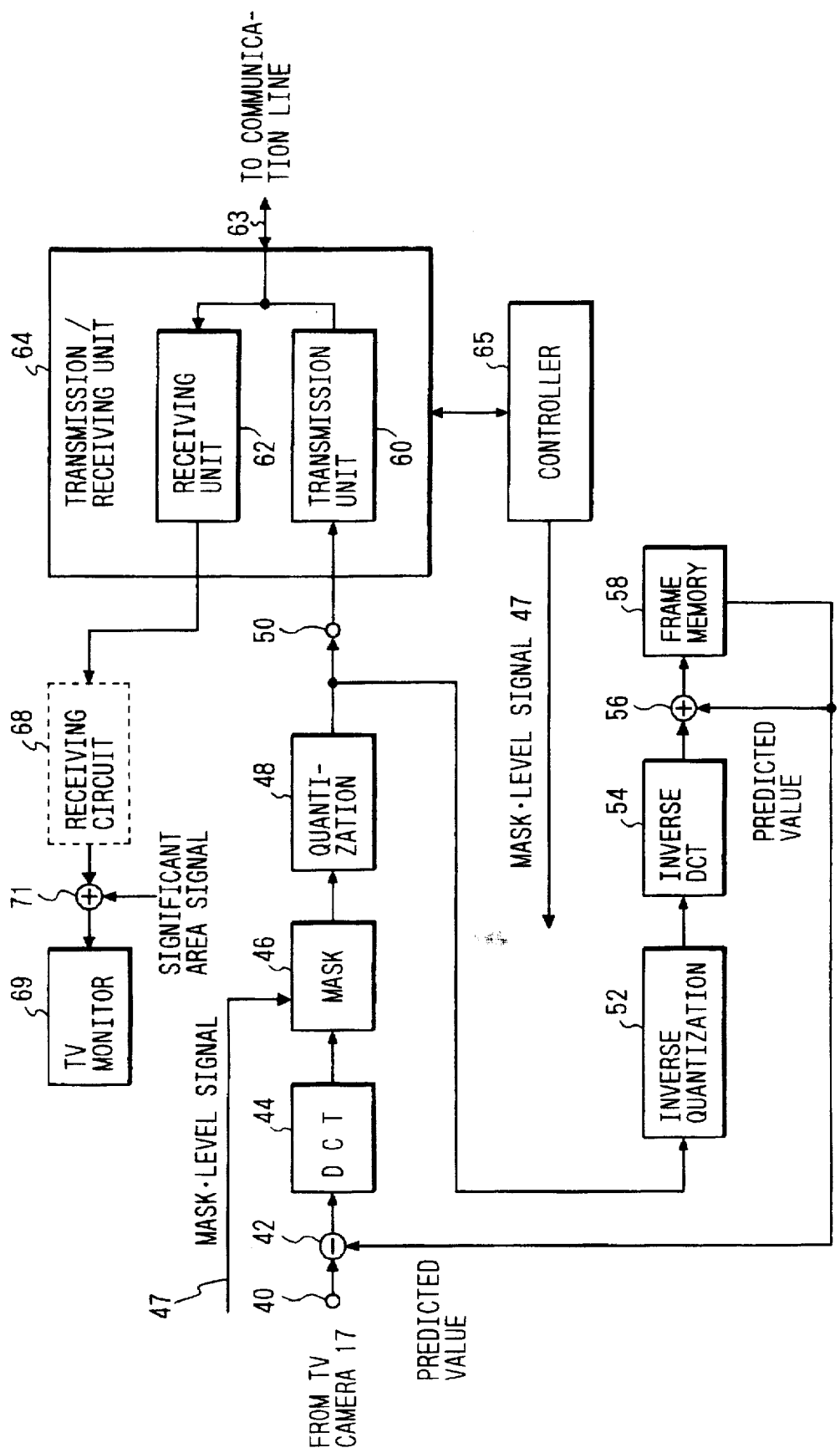
FIG. 2 is a block diagram of a basic encoding circuit of said embodiment.

FIG. 1 is an external view of an embodiment of the present invention applied to a television-telephone set, and FIG. 2 is a schematic block diagram of an encoding circuit thereof.

FIG. 1 illustrates a television-telephone set 10, with a monitor image frame 12, which displays a received image in FIG. 1. The display can be switched between the input (transmitted) image and the received image by the operation of a keyboard 14. Naturally the input image and the received image may be displayed in different windows, by the use of a window display system.

In the keyboard, there is provided a television camera 17. In the present embodiment, within the display of the received image on the monitor 12, an area to be received with high image quality or low image quality is designated by a mouse 16. A cursor 18 moves in the displayed image, in linkage with the movement of the mouse 16, thereby designating an arbitrary area 20. For such a designated area, the level of significance is designated from the keyboard 14. In order to regulate the image quality of encoding in the unit of each block wholly or partially contained in the designated area 20, the information on said area and its significance is transmitted from the receiving side to the transmitting side. The transmission of the information is executed, through a communication channel to be explained later, in the course of image data transmission from the transmitting side to the receiving side.

Such information of designation is transmitted to the partner of communication, together with image information to be transmitted thereto. The terminal of the partner transmits the image information by encoding a significant area with high image quality but a non-significant area with low image quality, while maintaining a constant amount of codes in the entire image frame.

The mouse 16 may naturally be replaced by another pointing device, such as a track ball, a joy stick, or a light pen.

The area designation may be achieved by designation of a significant area, designation of a non-significant area, or designation of level of significance for each designated area.

FIG. 2 shows an example of the encoding circuit, employing frame-to-frame difference encoding and DCT transformation, with a square block of 8×8 pixels as the unit of processing.

An input terminal 40 enters an image signal to be encoded, in the unit of the encoding block. A subtracter 42 subtracts estimated values from the pixel signals entered from the input terminal 40, and provides the predicted error in the frame-to-frame difference encoding.

A DCT circuit 44 effects discrete cosine transformation on the predicted error from the subtracter 42, thereby providing DCT coefficient data. A masking circuit 46 masks the DCT coefficient data from the DCT circuit 44 according to a mask level signal 47. The details of said masking circuit 46 will be explained later. A quantization circuit 48 quantizes the output of the masking circuit 46 with predetermined quantizing steps. An output terminal 50 sends the output of the quantization circuit 48 to a succeeding transmission unit 60, composed, for example, of a variable length encoding circuit, an error correction encoding circuit, and a transmission buffer. The unit 60 is connected, through a communication control unit (CCU), to a totally doubled public communication channel 63 (for example a digital channel such as ISDN).

A transmission/reception unit 64 is provided, in addition to the aforementioned transmission unit 60, with a reception unit 62 which separates, from the received data, data indicating the significant area, for supply to a controller 65. The controller 65 releases the mask level signal 47 according to a procedure to be explained later, based on said data indicating the significance.

There are also provided an inverse quantization circuit 52 for inverse quantization of the output of the quantization circuit 48; an inverse DCT circuit 54 for inverse discrete cosine transformation on the output of the inverse quantization circuit 52; an adder 56 for adding a predicted value to the output of the inverse DCT circuit 54, thereby providing an output corresponding to a locally decoded value; a frame memory 58 for storing the output of the adder 56 for a frame period and for providing pixel signals to be supplied, as the predicted value, to the subtracter 42 and the adder 56; a reception circuit 68 for decoding the received image data and converting the decoded data into a format suitable for display on a television monitor 69; and an adder 71 for superposing the data of the cursor 18 shown in FIG. 1 on thus-converted image data.

The masking circuit 46 is provided with five mask levels #1–#5, shown in FIGS. 3 to 7, selectable by the mask level signal 47. FIGS. 3 to 7 show the transmitted ones and masked ones, among 16 transformation coefficients released from the DCT circuit 44, in the block unit of 8×8 pixels. The coefficients in the hatched area are masked.

Figure 3:
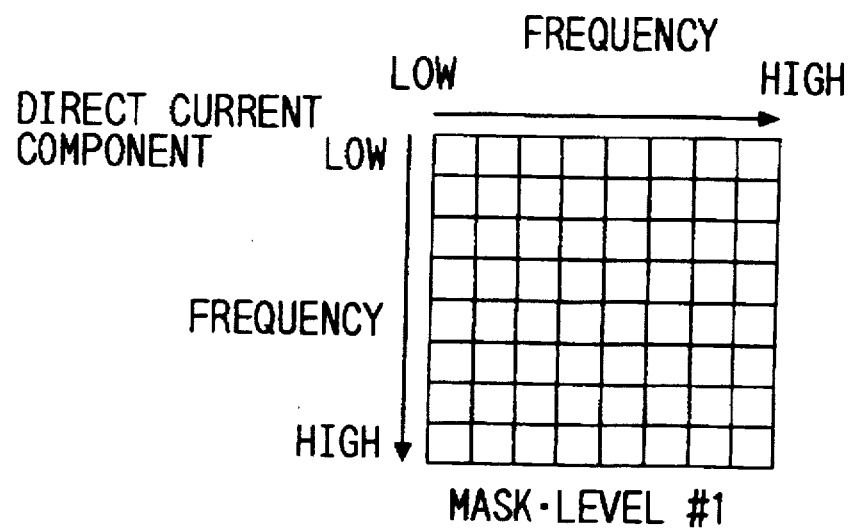
FIG. 3 is a schematic view of a mask level #1.
Figure 4:
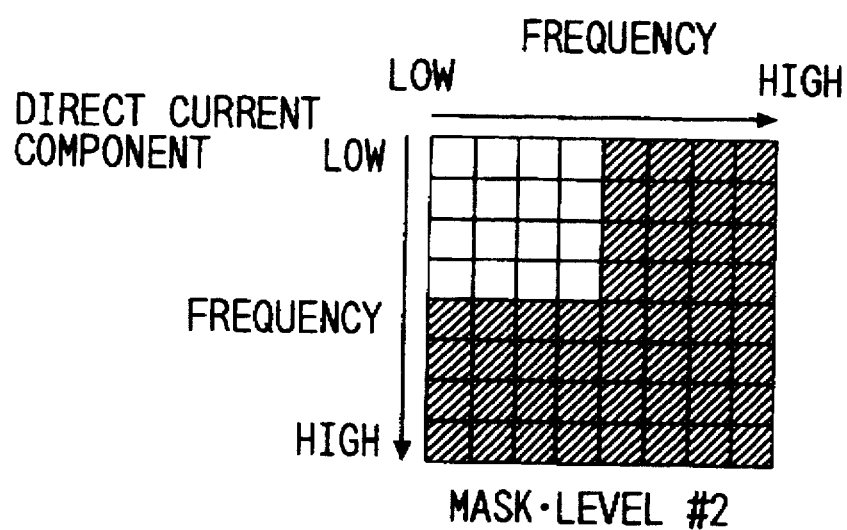
FIG. 4 is a schematic view of a mask level #2.
Figure 5:
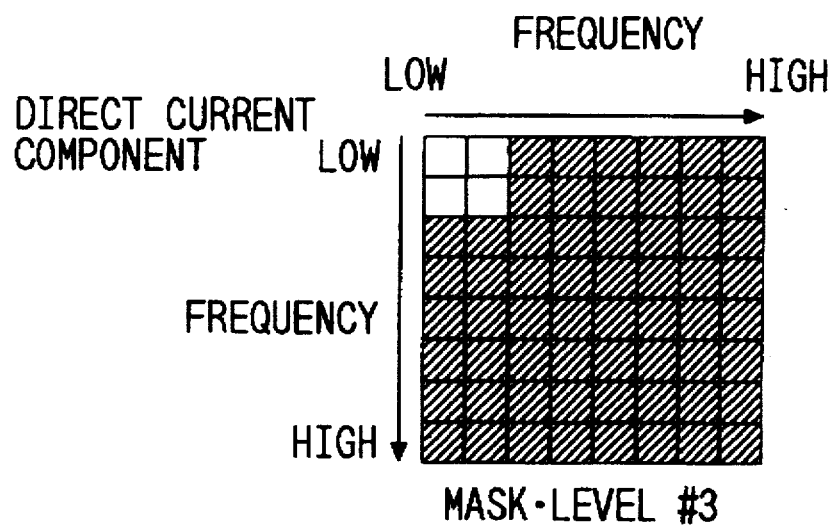
FIG. 5 is a schematic view of a mask level #3.
Figure 6:
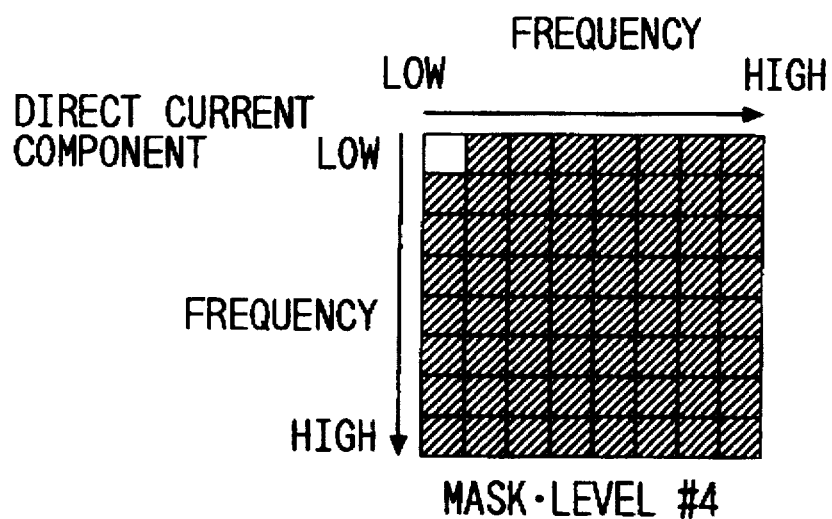
FIG. 6 is a schematic view of a mask level #4.
Figure 7:
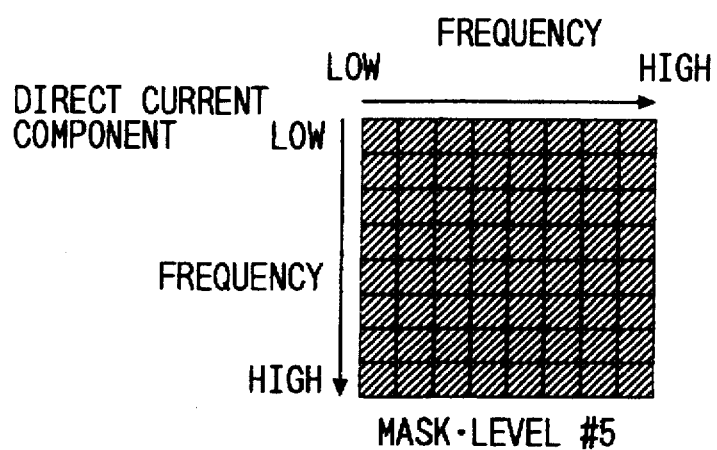
FIG. 7 is a schematic view of a mask level #5.

More specifically, in the mask level #1, all the outputs from the DCT circuit 44 are supplied to the quantization circuit 48, as shown in FIG. 3. In the mask level #2, as shown in FIG. 4, ¾ of the frequency region are masked, whereby the resolving power of the reproduced image becomes ½ of that of the original image, but the final amount of encoded image data is reduced. In the mask level #3, as shown by the hatched area in FIG. 5, ¾ of the encoding area of the mask level #2 is further masked, whereby the resolution of the reproduced image becomes ¼ of that of the original image. In the mask level #4, as shown by the hatched area in FIG. 6, masking is executed except for the DC component. This corresponds to the transmission of the average value of the pixels in the block. In the mask level #5, all the outputs of the DCT circuit 44 are masked. In this situation, the encoding is executed in such a manner that the reproduced image is the same as the preceding frame, equivalent to the freeze state.

In the following there will be explained the method of determining the mask level for each of the plural blocks constituting the image frame, in the controller 65, with reference to FIG. 8. In this embodiment, the image frame is classified into two levels of significant and non-significant. However, there are preferably employed three or more levels, or there may also be employed continuous levels. According to the data from the receiving side, indicating the area of significance, the controller 65 calculates the proportion of the blocks belonging to the significant area to all the blocks constituting the entire image frame, and determines the mask level of the blocks belonging to the significant area and that of the blocks belonging to the non-significant area, according to the chart shown in FIG. 8.

For example, if the proportion of the blocks belonging to the significant area is 40%, the mask level #1 is applied to the blocks belonging to the significant area, while the mask level #4 is applied to the blocks belonging to the non-significant area. In this case the resolving power of the reproduced image is the same as that of the original image in the significant area, but becomes ⅛ of that of the original image in the non-significant area.

Now there will be explained the function of the entire circuit shown in FIG. 2. The input terminal 40 receives the image signal to be encoded, in units of a block. The subtracter 42 subtracts the predicted value, supplied from the frame memory 58, from the image signal entered from the input terminal 40, and sends the predicted error to the DCT circuit 44.

The DCT circuit 44 effects discrete cosine transformation (DCT) on the predicted error from the subtracter, in units of a block, and supplies the masking circuit 46 with the DCT coefficient data. The masking circuit 46 masks the transformation coefficient data of each block to be supplied to the quantization circuit 48, according to the mask level signal 47, which is determined by the controller 65 as already explained in relation to FIG. 8, based on the data transmitted from the receiving side and separated by the reception unit 62. The quantization circuit 48 quantizes the DCT coefficient data from the masking circuit 46, with predetermined quantizing steps, and the output of the quantization circuit 48 is supplied from the output terminal 50 to the succeeding circuits.

The output of the quantization circuit 48 is also supplied to the inverse quantization circuit 52, which effects inverse quantization on the output with the same quantization steps as in the quantization circuit 48, and releases the representative value of the DCT coefficients. The inverse DCT circuit 54 effects inverse discrete cosine transformation on the output of the inverse quantization circuit 52, and the adder 56 adds the predicted value (output of the frame memory 58) to the output of the inverse DCT circuit 54. The output of the adder 56 is a locally decoded value, which is stored, as the predicted value for the next frame, in the frame memory 58. The image data read from said frame memory 58 are supplied, as the predicted value, to the subtracter 42 and the adder 56.

In the above-explained embodiment, the masking level for the DCT coefficients is regulated for the designated area, but similar effects can be obtained also by regulating the quantizing steps, or more specifically, by adopting finer quantizing steps as the significance of the area increases. It is also possible to form a color image in the significant area and a monochromatic image in other areas, or to combine such an operation mode with the above-mentioned modes.

The foregoing embodiment utilizes the discrete cosine transformation as encoding, but the present invention is applicable also to other exchange encoding methods or spatial area encoding methods.

Figure 8:
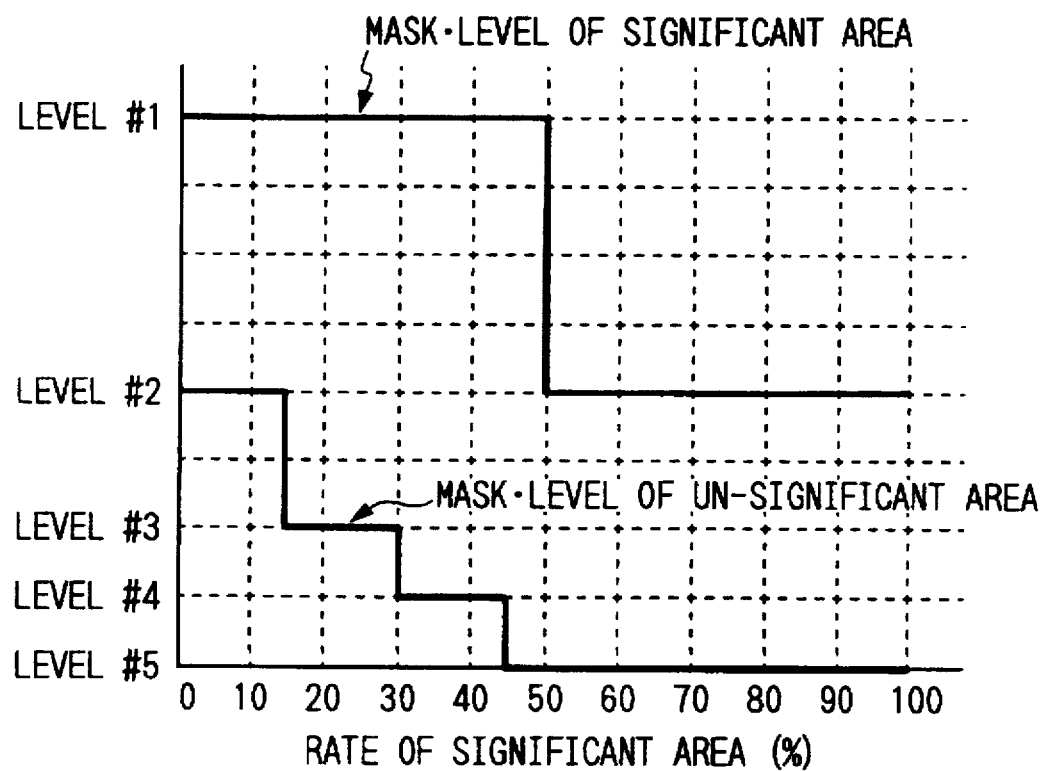
FIG. 8 is a chart showing mask level assignment to significant and non-significant areas.

FIG. 8 explains a case of dividing an image frame into a significant area and a non-significant area, but there may exist two or more significant areas and two or more non-significant areas in mixed manner. Also, it can be naturally expanded to a case in which the level of significance is designated in each of the designated areas.

Also in the foregoing embodiment, the image quality of each area in the received image is designated in the image receiving side, but the system may also be so designed that the image transmitting side designates the image quality of each area in the transmitted image. This will provide an effect of intentionally blurring an image portion which the transmitting side wishes to hide.

As will be easily understood from the foregoing, in the above-explained embodiment, the receiving side designates the significant area and sends the data indicating such designated area to the image transmitting side. Consequently it is rendered possible to transmit a large number of image frames per second, sufficient for obtaining a moving image, and to transmit the significant area with high image quality. Thus a smoothly moving image can be transmitted with sufficient image quality, even through a transmission channel of a low bit rate.

The encoding method employable in the present invention is not limited to that in the foregoing embodiment but can be modified in various manners.

Also, the present invention is not limited by the foregoing embodiment but is subject to various modifications within the scope and spirit of the appended claims.

What is claimed is:

1. An image communication apparatus comprising:

image pickup means for receiving, from an external receiver, designation information indicative of a desired area of image data to be transmitted back to the external receiver;

coding means for coding the image data to be transmitted; and controlling means for causing said coding means to code the image data of the desired area indicated by the designation information and image data of an area which is not the desired area with different respective compression ratios.

2. An apparatus according to claim 1, wherein said controlling means controls the compression ratio of said coding means in response to a size of the desired area designated by the designation information.

3. Apparatus according to claim 1, further comprising:

means for orthogonally transforming the image data; and quantization means for quantizing the orthogonally transformed image data.

4. Apparatus according to claim 3, wherein said coding means weights the image data by controlling quantizing coefficients which are used when the orthogonally transformed image data is quantized.

5. Apparatus according to claim 3, wherein said coding means weights the image data by mask processing conversion coefficients converted by said means for orthogonally transforming.

6. Apparatus according to claim 1, further comprising designating means, coupled to the receiver, for providing the designation information.

7. Apparatus according to claim 1, further comprising transmitting means for transmitting the image data coded by said coding means.

8. Apparatus according to claim 7, further comprising receiving means for receiving the image data transmitted by said transmitting means.

9. An image communication system comprising:

(a) first communication apparatus for transmitting coded image data through a transmission path; and (b) second communication apparatus for receiving the coded image data transmitted through the transmission path from said first communication apparatus, said second communication apparatus including:

designating means for designating a specific area of the image data transmitted by said first communication apparatus; and transmitting means for transmitting to said first communication apparatus designation information related to the specific area designated by said designating means;

said first communication apparatus including:

input means for inputting image data to be transmitted to said second communication apparatus;

coding means for coding the image data;

receiving means for receiving the designation information from said second communication apparatus; and controlling means for causing said coding means to code image data of the specific area indicated by the designation information and image data of an area which is not the specific area with different respective compression ratios.

10. A system according to claim 9, wherein said controlling means controls the compression ratio of said coding in response to a size of the specific area indicated by the designation information.

11. A system according to claim 9, wherein said first communication apparatus further comprises:

means for orthogonally transforming the image data; and quantization means for quantizing the orthogonally transformed image data.

12. A system according to claim 11, wherein said coding means weights the image data by controlling quantizing coefficients which are used when the orthogonally transformed image data is quantized.

13. A system according to claim 11, wherein said coding means weights the image data by mask processing conversion coefficients converted by said means for orthogonally transforming.

14. A system according to claim 9, wherein said input means comprises a television camera.

15. A system according to claim 9, wherein said designating means comprises a mouse.

16. An image communication method comprising the steps of:

receiving, from an image pickup apparatus, designation information indicative of a desired area of image data to be transmitted back to the image pickup apparatus;

coding the image data to be transmitted to the image pickup apparatus; and causing image data of the desired area indicated by the designation information to be coded with a different compression ratio than image data of an area which is not the desired area.

17. An image communication method comprising the steps of:

receiving, from an image pickup apparatus, designation information indicative of a desired area of image data to be transmitted back to said image pickup apparatus;

coding the image data to be transmitted; and controlling said coding step so as to code the image data of the desired area indicated by the designation information and image data of an area which is not the desired area with different respective compression ratios.

* * * * *

UNITED STATES PATENT AND TRADEMARK OFFICE
CERTIFICATE OF CORRECTION

PATENT NO. : 5,666,154
DATED : September 9, 1997
INVENTOR(S) : YASUJI HIRABAYASHI It is certified that error appears in the above-identified patent and that said Letters Patent is hereby corrected as shown below:

TITLE PAGE:
At [30] Foreign Application Priority Data

"4-2047665" should read --4-204665--.

Column 1

Line 30, "example" should read --example,--.
Line 57, "plural each of" should read --each of plural--.

Column 2

Line 33, "naturally" should read --naturally,--

Column 3

Line 18, "example" should read --example,--.
Line 49, "region" should read --regions--.

Signed and Sealed this

Fourteenth Day of April, 1998

Attest:

BRUCE LEHMAN

Attesting Officer

Commissioner of Patents and Trademarks